(12) United States Patent
Gerth et al.

(10) Patent No.: US 7,869,004 B2
(45) Date of Patent: Jan. 11, 2011

(54) OPTICAL OBSERVATION APPARATUS

(75) Inventors: Stefan Gerth, Sinn (DE); Volker Tautz, Wetzlar (DE); Armin Schlierbach, Leun (DE); Gerd Schreiter, Weilburg (DE); Kurt Becker, Wettenberg (DE); Gerd Polzer, Wetzlar-Hermannstein (DE); Christof Heintz, Oberursel (DE); Norbert Müller, Asslar (DE)

(73) Assignee: Carl Zeiss Sports Optics GmbH, Wetzlar (DE)

( * ) Notice: Subject to any disclaimer, the term of this patent is extended or adjusted under 35 U.S.C. 154(b) by 84 days.

(21) Appl. No.: 12/069,668

(22) Filed: Feb. 12, 2008

(65) Prior Publication Data

US 2008/0204702 A1  Aug. 28, 2008

(30) Foreign Application Priority Data

Feb. 12, 2007 (DE) .................. 10 2007 007 380

(51) Int. Cl.
*G01C 3/08* (2006.01)
(52) U.S. Cl. ..................................... 356/4.01; 356/5.01
(58) Field of Classification Search ................ 356/4.01, 356/5.01; 359/399
See application file for complete search history.

(56) References Cited

U.S. PATENT DOCUMENTS

| 5,583,693 A | * | 12/1996 | Funatsu ....................... 359/425 |
| 5,760,885 A | | 6/1998 | Yokoyama et al. |
| 5,877,850 A | | 3/1999 | Ogata |
| 6,646,799 B1 | * | 11/2003 | Korniski et al. ............. 359/407 |
| 6,819,495 B2 | | 11/2004 | Shani et al. |
| 6,862,084 B2 | | 3/2005 | Nagata et al. |
| 6,903,811 B2 | * | 6/2005 | Watanabe ................... 356/5.01 |
| 7,271,954 B2 | * | 9/2007 | Perger et al. ................. 359/407 |
| 2003/0002149 A1 | * | 1/2003 | Watanabe ................... 359/407 |
| 2005/0128576 A1 | | 6/2005 | Perger et al. |
| 2006/0109450 A1 | | 5/2006 | Liu |
| 2009/0174939 A1 | * | 7/2009 | Heintz et al. ................. 359/480 |

FOREIGN PATENT DOCUMENTS

| CH | 487392 | 4/1970 |
| DE | 692 21 700 T 2 | 10/1991 |
| DE | 43 16 348 A 1 | 11/1994 |
| DE | 1 351 070 A1 | 3/2002 |
| DE | 1 542 052 A1 | 12/2004 |
| DE | 202005018197 | 3/2006 |
| EP | 1542052 | 6/2005 |
| GB | 2 420 405 A | 5/2006 |

* cited by examiner

*Primary Examiner*—Isam Alsomiri
(74) *Attorney, Agent, or Firm*—Wells St. John, P.S.

(57) ABSTRACT

An optical observation apparatus with at least one observation beam path and with means for laser range-finding, which have at least one transmitting device and at least one receiving device and are arranged outside the at least one observation beam path. The transmitting device and the receiving device are arranged in each case in separate housing parts of the optical observation apparatus and/or, if a folding bridge of the optical observation apparatus is present, along a mid-axis of the folding bridge. At least one diffractive optical element is provided for shaping at least the receiving beam for the at least one receiving device.

10 Claims, 6 Drawing Sheets

OPTICAL OBSERVATION APPARATUS

CROSS REFERENCE TO RELATED APPLICATION

This application relates to and claims priority to corresponding German Patent Application No. 10 2007 007 380.3, which was filed on Feb. 12, 2007, and which is incorporated by reference herein.

BACKGROUND OF THE INVENTION

1. Field of the Invention

The invention relates to an optical observation apparatus with at least one observation beam path and with means for laser range-finding, which have at least one transmitting device and at least one receiving device and are arranged outside the observation beam path.

2. Description of the Related Art

Such an optical observation apparatus is known from U.S. Pat. No. 6,862,084 B2.

Known optical observation apparatuses with separate laser range-finding optics have voluminous housings or unpractical designs in order to accommodate the corresponding additional beam paths which have, in particular, lenses or the like as optical elements.

Furthermore, reference is made to DE 692 21 700 T2 and EP 1 542 052 A1.

SUMMARY OF THE INVENTION

The present invention is based on the object of providing an optical observation apparatus of the type mentioned in the introduction which is as compact as possible.

This object is achieved according to the invention by virtue of at least one diffractive optical element being provided for shaping at least the receiving beam for the at least one receiving device.

The measures according to the invention provide, in a simple and advantageous manner, a compact optical observation apparatus by virtue of the transmitting device and the receiving device being arranged in separate housing parts of the optical observation apparatus and/or, if a folding bridge of the optical observation apparatus is present, along a mid-axis of the folding bridge, with at least the receiving beam being shaped by a diffractive optical element. Due to the low installation space requirement of diffractive optical elements, in particular diffraction gratings or the like, it is possible to match the optical system optimally to the apparatus geometry. Furthermore, the optics design can be optimized for a radiation wavelength, in particular for the wavelength of the laser.

The invention can furthermore provide for at least one diffractive optical element to be provided for shaping the transmitting beam of the at least one transmitting device.

In this manner, it is also possible to design the beam path of the transmitting beam for the transmitting device in a space-saving manner, which results in an even more compact design of the optical observation device being possible.

The transmitting device and the receiving device can be arranged one after the other along the optical axis of the means for laser range-finding or one next to the other at least approximately in a plane perpendicular to the optical axis of the means for laser range-finding.

The object is likewise achieved by the characterizing features of Claim 5. Advantages in this respect can be gathered analogously and with reference to the description.

It is advantageous if the transmitting device and the receiving device are arranged in a manner offset in a direction perpendicular to the optical axis of the means for laser range-finding.

In this manner, shading of the receiving device by the transmitting device, in particular by its printed circuit board, is avoided.

The optical observation apparatus can be designed according to the invention as binoculars having a folding bridge. The transmitting device and the receiving device can then be arranged in the region in particular of the mid-axis of the folding bridge.

Exemplary embodiments of the invention will be described schematically below using the drawings.

DETAILED DESCRIPTION

Figure 1:
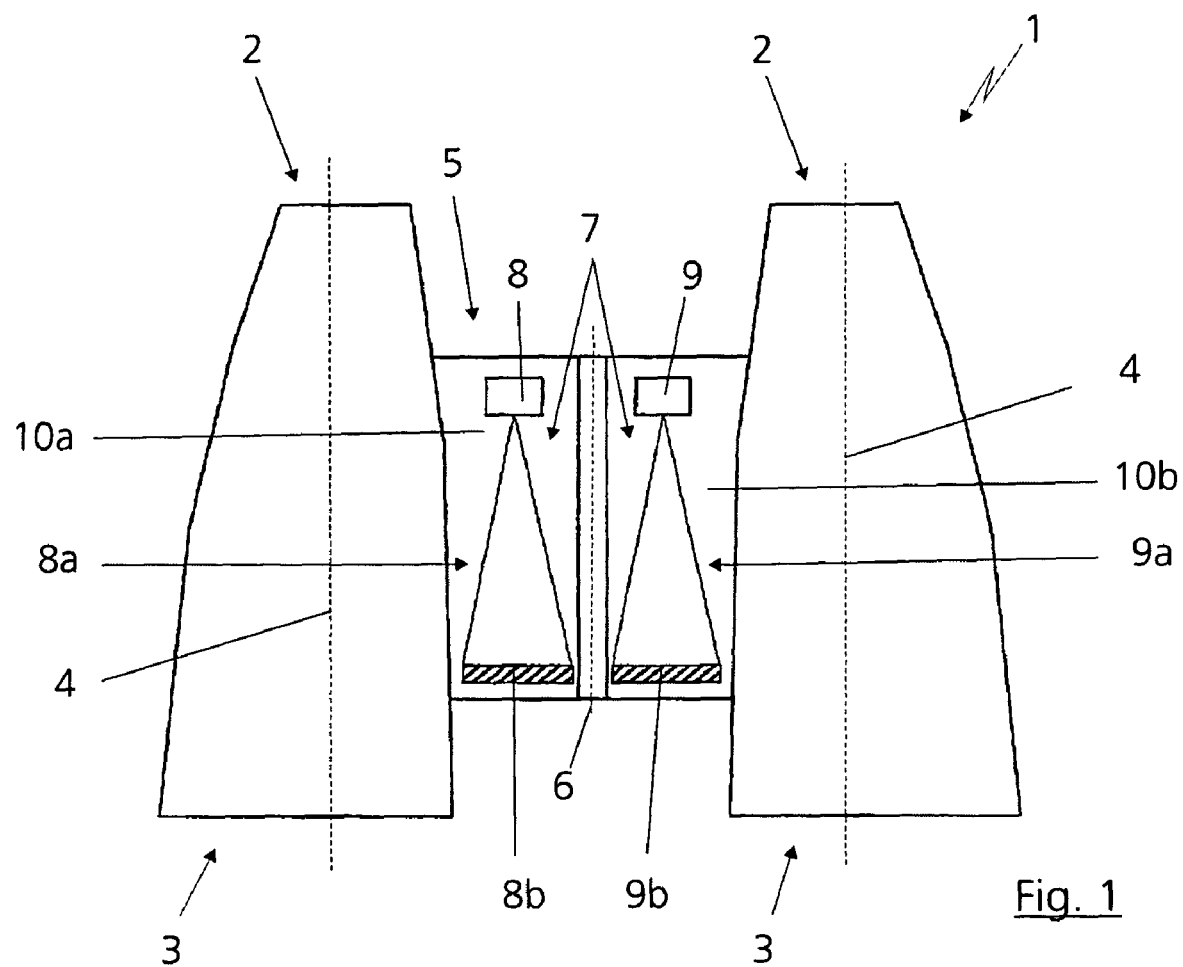
FIG. 1 shows a simplified sectional view of an optical observation apparatus according to the invention in a first embodiment from above.

The invention is described below with reference to binoculars as the optical observation apparatus. The optical observation apparatus according to the invention can in further exemplary embodiments of course also be in the form of a telescope, spotting scope or the like.

In the figures, functionally identical or similar elements have the same reference numerals. Where appropriate, apostrophes are added for differentiating between different embodiments.

FIG. 1 shows a compact optical observation apparatus according to the invention in the form of a pair of binoculars 1. The pair of binoculars 1 has eyepieces 2 and objectives 3. Observation beam paths 4 are indicated by dashes in FIG. 1. A folding bridge 5 with a mid-axis or articulated joint axis 6 (indicated by dashes) is arranged between the observation beam paths 4. In further exemplary embodiments which are not shown, the folding bridge 5 could also have a plurality of, in particular two, axes. Means 7 for laser range-finding, which have a transmitting device 8 for emitting a laser radiation in a predefined wavelength range and a receiving device 9 for receiving the emitted laser radiation reflected by objects, are arranged outside the observation beam paths 4 in the region of the mid-axis 6 of the folding bridge 5. The means 7 for laser range-finding have of course an evaluation electronics system for ascertaining the range of a targeted object. Said electronics system is, however, not explicitly shown in the figures. Due to the separate arrangement of the means 7 for laser range-finding outside the observation beam paths 4, the transmission in the observation beam paths 4 is advantageously not negatively influenced. Due to the separate transmitting and receiving optics, unvarying aspect ratios are obtained. Focusing elements, which are possibly present in other exemplary embodiments (not illustrated), in the visual channel or observation beam path 4 do not adversely affect the means 7 for laser range-finding. The transmitting device 8 and the receiving device 9 are arranged one next to the other in each case in separate housing parts 10a, 10b in a plane perpendicular to the mid-axis or optical axis 6 of the means 7 for laser range-finding. The transmitting beam or transmitting beam path of the transmitting device 8 is provided with the reference numeral 8a and the receiving beam or receiving beam path for the receiving device 9 is provided with the reference numeral 9a. A diffractive optical element 8b is provided for shaping the transmitting beam 8a of the transmitting device 8. Furthermore, a diffractive optical element 9b is likewise provided for shaping the receiving beam 9a for the receiving device 9. The focal lengths of the two diffractive optical elements 8b, 9b can lie in the range from about 10 mm to 80 mm. The optical axes of the transmitting device 8 and of the receiving device 9 are fixedly arranged such that they are parallel to one another. Both components 8, 9 must be aligned with the reticle of the associated housing. The transmitting device 8 and the receiving device 9 can, for example, be aligned via a double eccentric or a displacement of printed circuit boards of the transmitting device 8 and of the receiving device 9.

Figure 2:
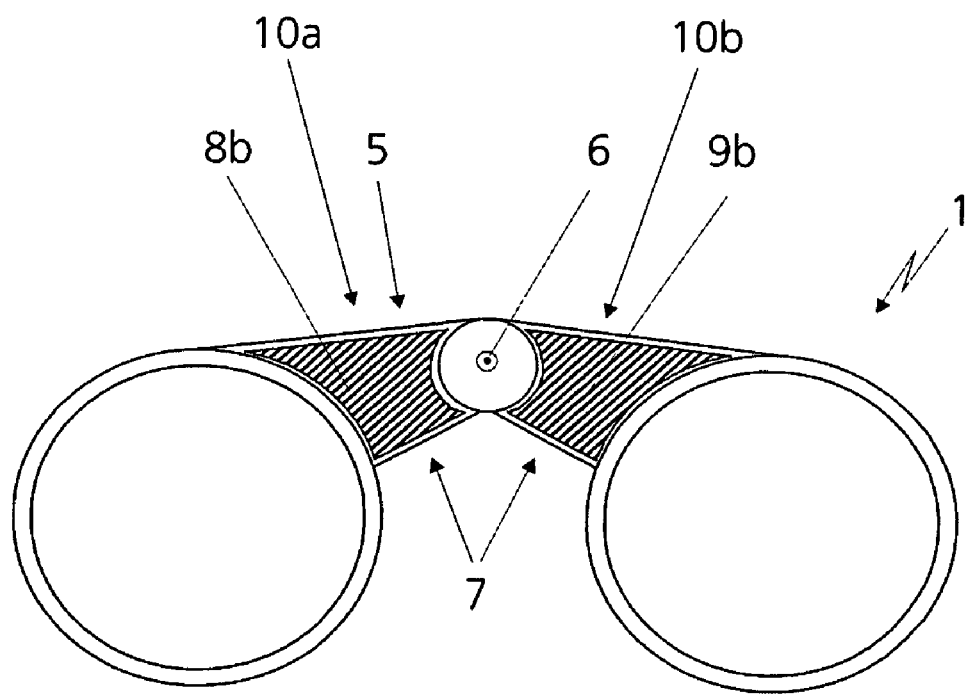
FIG. 2 shows a simplified front view of the optical observation apparatus according to the invention from FIG. 1.
Figure 3:
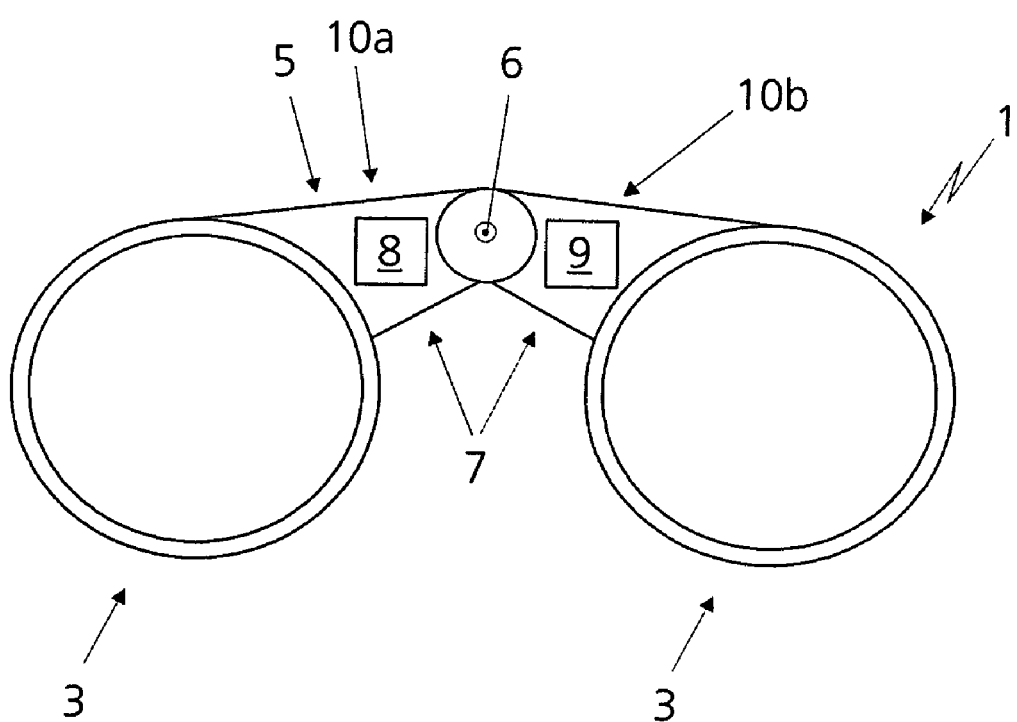
FIG. 3 shows a simplified sectional view of the optical observation apparatus according to the invention from FIG. 1 from the front.

FIG. 2 illustrates a simplified front view of the optical observation apparatus 1 according to the invention. FIG. 3 shows a simplified sectional view of the optical observation apparatus 1 according to the invention likewise from the front, wherein the diffractive optical elements 8b, 9b are not illustrated.

Figure 4:
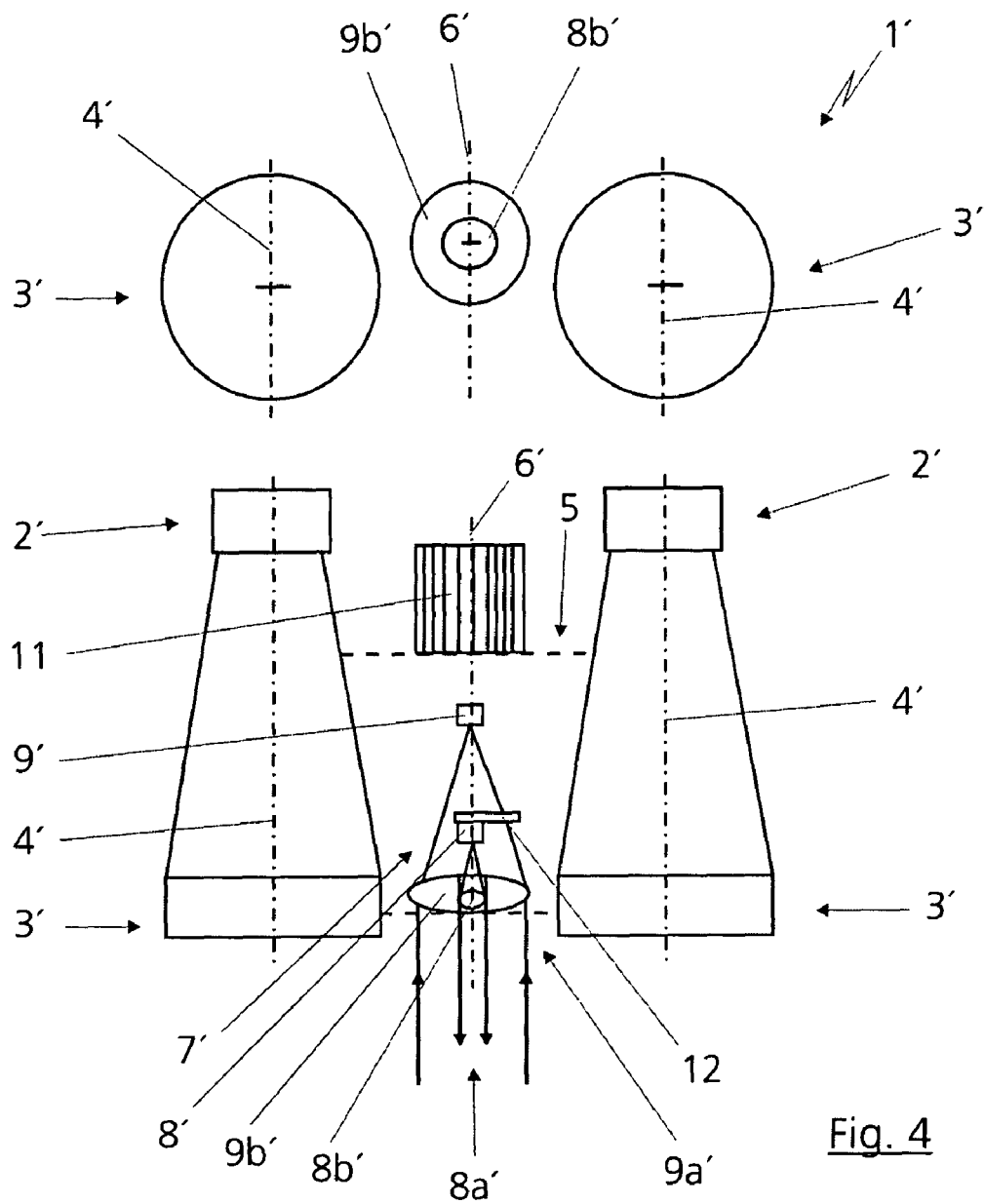
FIG. 4 shows a simplified sectional view of an optical observation apparatus according to the invention in a second embodiment from above and from the front.
Figure 5:
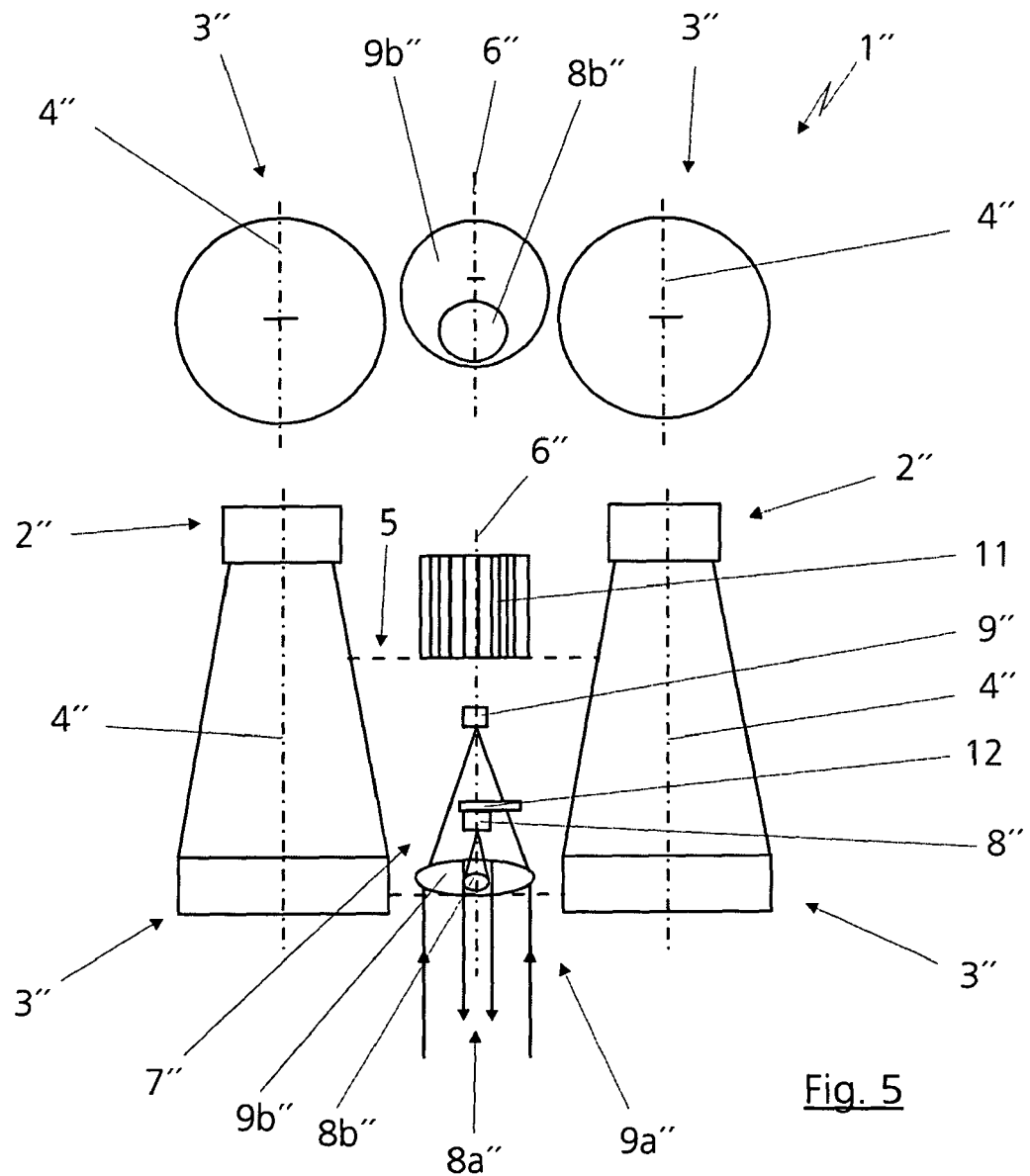
FIG. 5 shows a simplified sectional view of an optical observation apparatus according to the invention in a third embodiment from above and from the front.

FIG. 4 illustrates a second embodiment of a pair of binoculars 1', with a range adjustment element 11 being additionally indicated by dashes in the region of the folding bridge illustrated in FIGS. 4 and 5. The transmitting device 8', arranged on a printed circuit board 12, and the receiving device 9' are arranged along the optical axis or in the present exemplary embodiment along the articulated joint axis or mid-axis 6' of the binoculars 1' in a fixed arrangement one after the other with different focal lengths with transmitting and receiving beam paths 8a', 9a', wherein the printed circuit board 12 of the transmitting device 8' projects into the receiving beam path 9a' and wherein, as a result, the receiving device 9' is correspondingly partially shaded. For shaping the receiving beam 9a', a diffractive optical element 9b' is provided, in whose centre a diffractive optical element 8b' for shaping the transmitting beam 8a' is arranged. In further exemplary embodiments (not illustrated), it is also possible for other optical elements such as lenses or, in an appropriate combination, a drilled lens with a collimator lens or a Fresnel lens with a collimator lens to be used, rather than the two diffractive optical elements 8b', 9b'. The transmitting device 8' can, for example, be imaged by means of an aspherical collimator lens or a spherical glass lens.

FIG. 5 illustrates a third embodiment of a pair of binoculars 1", wherein, as in FIG. 4, transmitting device 8" and receiving device 9" are arranged one after the other along the optical axis 6", but in a manner offset in a direction perpendicular to the optical axis 6". For shaping the receiving beam 9a", a lens 9b" is provided, in whose rim a lens 8b" for shaping the transmitting beam 8a" is arranged. Contrary to the embodiment in accordance with FIG. 4, this advantageously results in a substantially smaller amount of shading of the receiving device 9" by the transmitting device 8", in particular by its printed circuit board 12. In further exemplary embodiments (not illustrated), it would also be possible for other optical elements such as diffractive optical elements or, in an appropriate combination, a drilled lens with a collimator lens or a Fresnel lens with a collimator lens to be used, rather than the lenses 8b", 9b".

Figure 6:
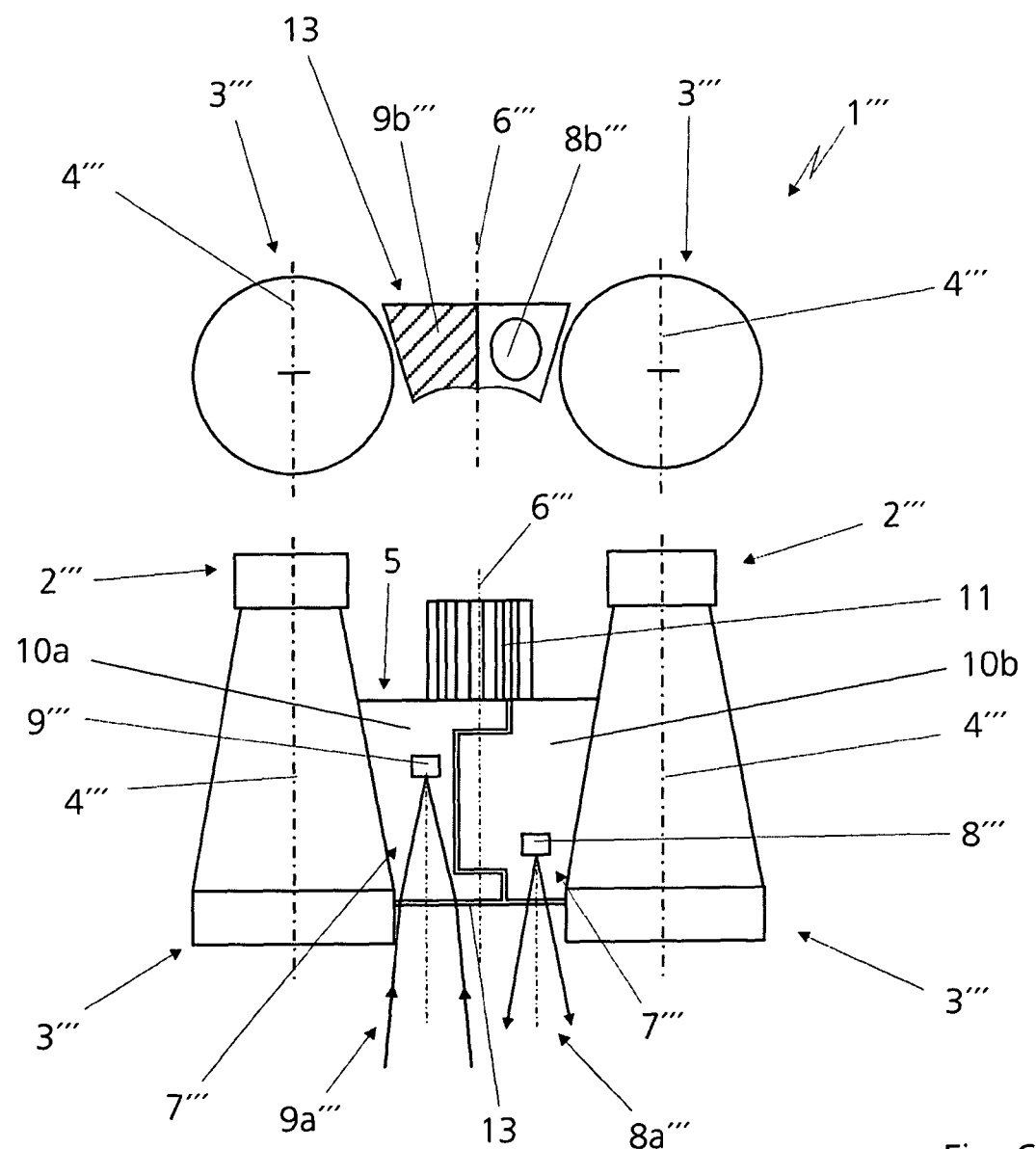
FIG. 6 shows a simplified sectional view of an optical observation apparatus according to the invention in a fourth embodiment from above and from the front.

FIG. 6 illustrates a fourth embodiment of a pair of binoculars 1''', wherein a transmitting device 8''' and a receiving device 9''' are arranged in each case in separate housing parts 10a, 10b of the binoculars 1'''. Furthermore, the transmitting device 8''' and the receiving device 9''' are covered by a common, transparent, preferably plastic, covering plate 13. In the present exemplary embodiment, a plastic lens 8b''' is provided on or in the covering plate 13 for shaping the transmitting beam 8a''' of the transmitting device 8'''. In other exemplary embodiments (not illustrated), a diffractive optical element 8b''' could also additionally be provided. Furthermore, a diffractive optical element 9b''', which focuses the light onto the receiving device 9''', is provided in the covering plate 13 for shaping the receiving beam 9a''' for the receiving device 9'''. In other exemplary embodiments, the covering plate 13 could be in the form of a diffractive optical element 8b''', 9b''' both for the transmitting device 8''' and also for the receiving device 9'''.

The arrangements described in FIGS. 4, 5 and 6 are likewise also space-saving, whereby compact binoculars 1', 1", 1''' can be produced.

Figure 7:
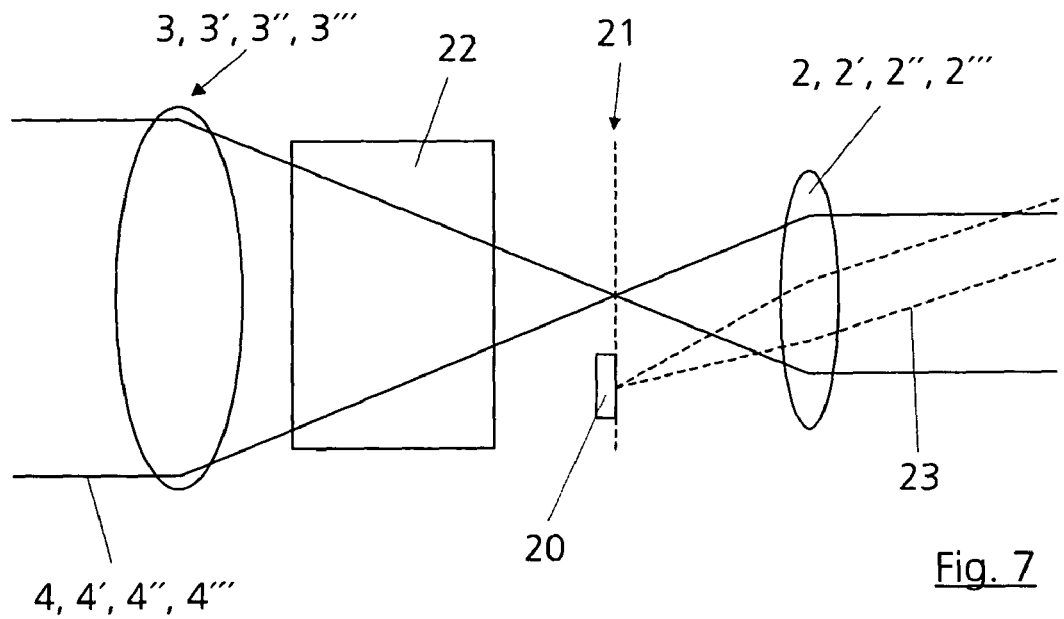
FIG. 7 shows a schematic of a display arrangement in a first embodiment.

FIG. 7 schematically illustrates, in a simplified manner, a first option for displaying an image of a display device or a display 20 to the user in the observation beam path 4, 4', 4", 4''' of the observation apparatus 1, 1', 1", 1'''. Here, the display 20 is arranged directly between a prism 22 and the eyepiece 2, 2', 2", 2''' in an intermediate image plane 21 of the observation apparatus 1, 1', 1", 1'''. A display beam path 23 is indicated by dashes.

Figure 8:
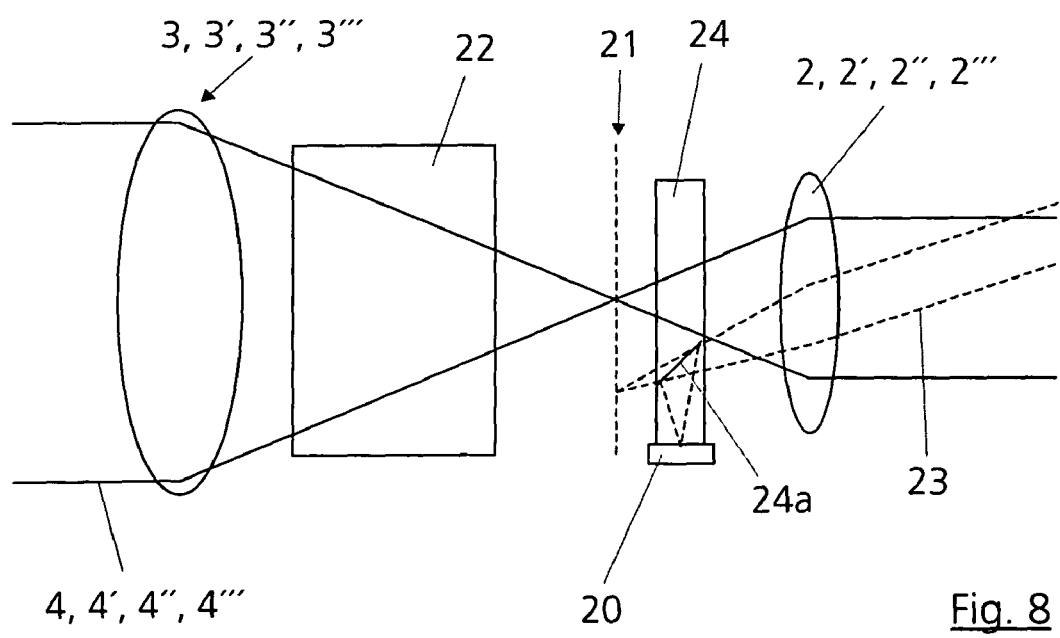
FIG. 8 shows a schematic of a display arrangement in a second embodiment.

FIG. 8 shows a second option for displaying an image of a display device or a display 20 to the user in the observation beam path 4, 4', 4", 4''' of the observation apparatus 1, 1', 1", 1'''. Here, the image of the display 20 is reflected, via a plane plate 24 with a beam-splitter layer 24a, into the observation beam path 4, 4', 4", 4'''. In the present exemplary embodiment, the display 20 is mounted on the plane plate 24. This is not mandatory, however.

Furthermore, the display 20 could also be arranged on an upper side of the observation apparatus 1, 1', 1", 1'''. The range-finding value can be displayed visually via the display 20. The display 20 can be in the form of a four-segment display. Moreover, an acoustic indication or a data transfer to an external apparatus, in particular via a wireless interface, is also possible.

In the observation apparatus 1, 1', 1", 1''' according to the invention, a reticle with round or square, in particular finely structured, permanent sighting mark for day-vision use for detecting objects can preferably be provided. This makes direct measurement possible. Furthermore, the reticle can have an etched luminous mark. For rangefinding at poor visibility or at dusk, this illuminated sighting mark can be switched on.

In further exemplary embodiments (not illustrated), it is feasible to design the means 7, 7', 7", 7''' for laser range-finding in a modular manner for mounting in different observation apparatuses.

What is claimed is:

1. Binoculars with two observation beam paths and with means for laser range-finding, which have at least one transmitting device and at least one receiving device arranged outside the two observation beam paths, wherein the at least one transmitting device is configured to transmit a beam along a transmitting beam path and the at least one receiving device is configured to receive a beam along a receiving beam path, and wherein inside the binoculars each of the transmitting beam path and the receiving beam path is separate and distinct from each of the two observation beam paths, and wherein the transmitting device and the receiving device are arranged in each case in separate housing parts of the binoculars, wherein a folding bridge is provided by which the separate housing parts are movable relative to each other, and wherein at least one diffractive optical element being provided for shaping at least the receiving beam for the at least one receiving device.

2. Binoculars according to claim 1, wherein at least one diffractive optical element is provided for shaping the transmitting beam of the at least one transmitting device.

3. Binoculars according to claim 1, wherein the transmitting device and the receiving device are arranged one next to the other at least approximately in a plane perpendicular to the mid-axis of the folding bridge.

4. Binoculars according to claim 1, wherein the transmitting device and the receiving device are arranged one after the other along the mid-axis of the folding bridge.

5. Binoculars according to claim 1, wherein the transmitting device and the receiving device are arranged in the region in particular of the mid-axis of the folding bridge.

6. Binoculars according to claim 1, wherein inside the binoculars the receiving beam path is separate and distinct from the transmitting beam path.

7. Binoculars according to claim 1, wherein the folding bridge comprises an articulated joint axis, and wherein the receiving beam comprises a receiving beam path, and wherein at least one of the transmitting beam path and the receiving beam path is coincident with the articulated joint axis.

8. Binoculars according to claim 1, wherein the transmitting device and the receiving device are arranged offset from each other in the direction of the mid-axis of the folding bridge.

9. Binoculars according to claim 1, wherein the transmitting device and the receiving device are arranged in different planes which are perpendicular to the mid-axis of the folding bridge.

10. Binoculars according to claim 1, wherein a structure of the binoculars comprises a front end opposite a rear end, and wherein one of the transmitting device and the receiving device is arranged more proximate the front end than the other of the transmitting device and the receiving device.

* * * * *